Oct. 31, 1961
T. T. HUCKABEE
3,006,767
METHOD FOR TREATING MEAT
Filed June 9, 1960
3 Sheets-Sheet 1
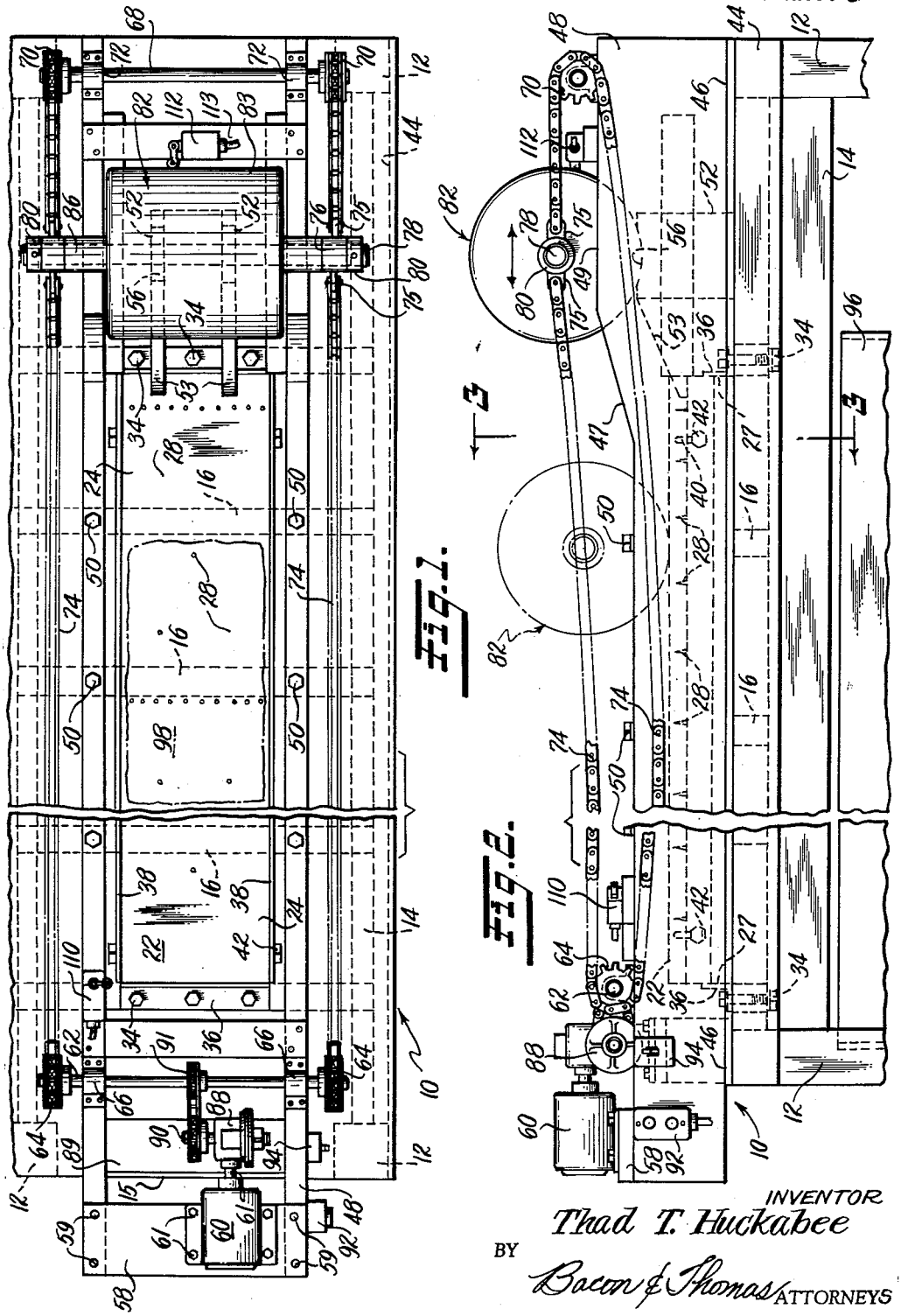
INVENTOR
Thad T. Huckabee
BY
Bacon & Thomas ATTORNEYS Oct. 31, 1961     T. T. HUCKABEE     3,006,767

METHOD FOR TREATING MEAT

Filed June 9, 1960     3 Sheets-Sheet 2

INVENTOR.
Thad T. Huckabee
BY
Bacon & Thomas
ATTORNEYS

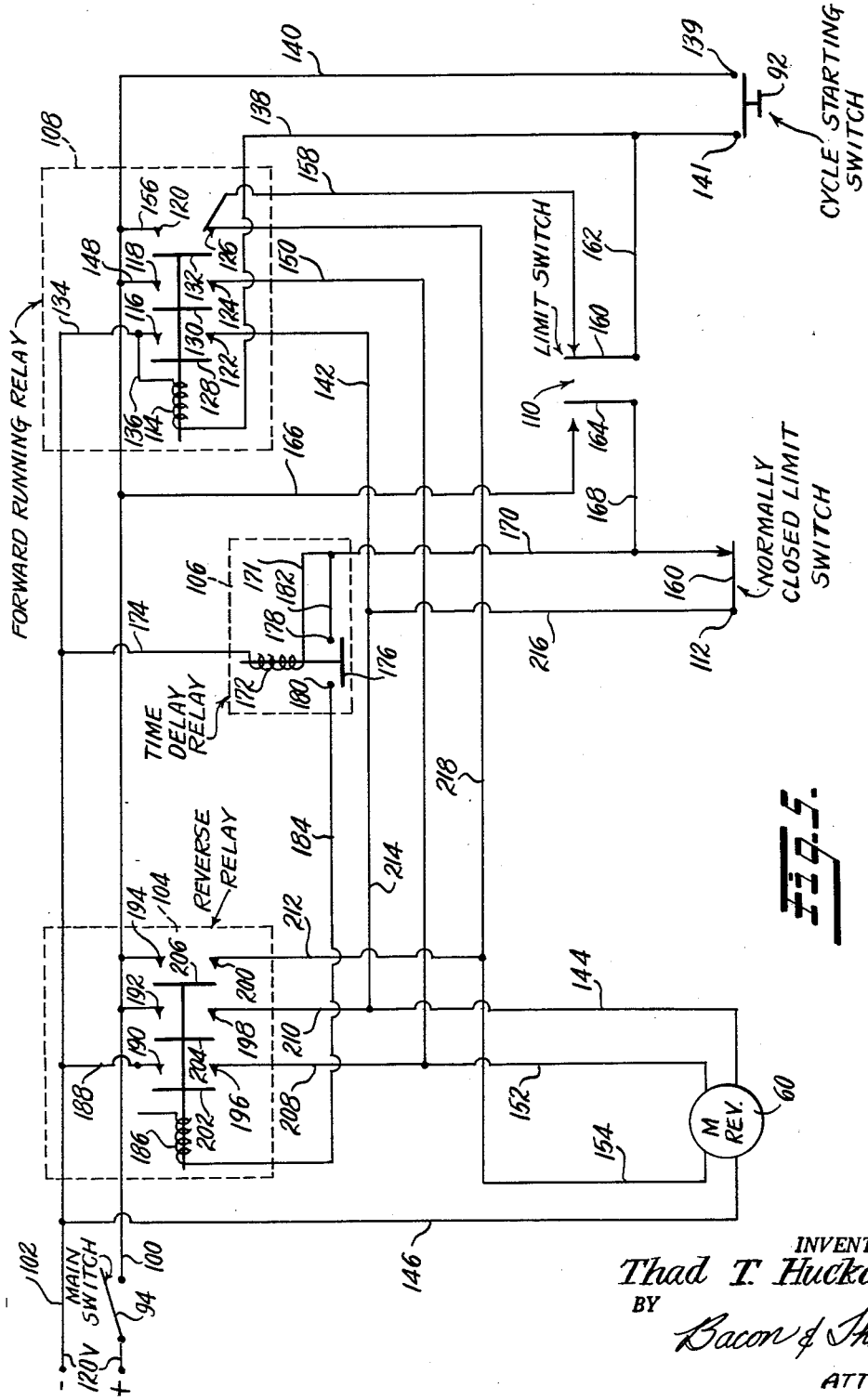

United States Patent Office 3,006,767
Patented Oct. 31, 1961

3,006,767
METHOD FOR TREATING MEAT
Thad T. Huckabee, P.O. Box 749, Albany, Ga.
Filed June 9, 1960, Ser. No. 35,091
4 Claims. (Cl. 99—107)

This invention relates generally to the treatment of meat, and more specifically to a novel method and apparatus designed to handle meat in which a treating fluid has already been injected, to effect uniform distribution of the treating fluid in the meat, and to remove excess treating fluid from the meat.

The invention contemplates the application of pressure to meat containing a treating fluid in such a manner that the pressure will disperse the treating fluid throughout the meat, forcing out any excess treating fluid that may be present, particularly in pockets or other cavities in the meat.

Briefly, the invention comprises a method and apparatus for securely holding a piece of meat in place on a bed, and progressively applying pressure to the meat by passing a roller across the meat while so held. In this way, the roll pressure is first applied at one edge of the meat and slowly but progressively continues in a direction toward the opposite edge. The rolling speed of the roller is such that ample opportunity is afforded for the treating solution to penetrate the pores and fibers of the meat, so that a highly desirable uniform distribution of the solution is effected in the meat in a matter of seconds. The apparatus includes means for adjusting or limiting the compression of the meat by the roller as it is passed thereover, and ordinarily a single pass of the roller is sufficient. However, it will be understood that the roller may be passed over the meat more than once, if desired.

Meat, such as slabs of bacon and the like, is conventionally treated with a brine or pickling solution by impregnating the slab with the solution on a "stitching" machine, wherein hollow needles, spaced so that there are about four to each square inch, enter the slab from one side thereof to inject the treating solution into the slab under pressure while the needles are penetrating the slab. Another known method of treatment, used on ham or other cuts of meat having an artery system, involves the pumping of the treating solution under pressure into the artery system instead of "stitching." In either of the above methods, the treated meat is hung to "dry" to permit excess pickling solution to drain from the meat.

One of the objections to the foregoing practice of injecting treating solution and hanging, is that it requires about 12 to 18 hours to properly drain or "dry" the meat before it can be smoked. Another objection is that, frequently the solution is forced into a pocket or other localized area in the meat, where it stays and does not drain out, thereby resulting in an objectionable color and taste being imparted to the meat because of the presence of excess treating solution in such areas.

The practice of "stitching" results in a better distribution of the treating solution than is obtained by arterial injection. However, "stitching" is not the ultimate answer for the reason that it does not avoid injection into pockets and otherwise does not effect uniform distribution of the treating solution in the pores and fibers of the meat, all of which detracts from uniformity and quality of flavor, and from the color and appearance of the treated meat. A further objection to the drying practice is that the heat applied to speed up "drying" causes a substantial loss in weight of the meat, as compared to green weight before injection of the treating solution, and which ranges from an average minimum of about 6% to as high as 12%.

The principal object of this invention, therefore, is to provide a novel method and apparatus for treating meat which eliminates the objectionable delay and weight-loss in the hanging of the meat after being subjected to a treating solution, and which effects a more efficient removal of excess solution in a much shorter time.

Another object is to provide a method and apparatus for treating meat which produces a product having a uniform, improved taste and appearance.

Still another object is to provide a method and apparatus for treating mean which eliminates objectionable pockets of localized areas of treating solution and effects a uniform dispersion of the solution throughout the meat.

A further object is to provide a method of treating meat which minimizes the loss of weight in processing and curing meat that has been heretofore accepted as inevitable.

A still further object is to provide a method of treating meat into which a treating solution has been injected, involving a slow rolling under controlled conditions to cause the treating solution to enter the tissues, and wherein only excess treating solution is forced out of the meat, without damaging the meat or permanently reducing its dimensions.

A further object is to provide a method of treating meat into which a treating solution has been injected, which produces a finished product, after curing, having substantially the same size and weight that the meat had prior to treatment.

Another object is to increase the shelf life of the finished product. This is done by obtaining a uniform distribution of the treating liquid. Moreover, the keeping quality is increased up to 20% and more with no trace of sourness or slimy surface, which occurs in meats cured under the present hanging process.

A still further object is to provide apparatus for carrying out the objects mentioned above.

Other and further objects will be apparent to persons skilled in the art in light of the following description taken in conjunction with the accompanying drawings, wherein:

FIG. 1 is a plan view of meat treating apparatus according to the invention;

FIG. 2 is a front elevational view of the apparatus;

FIG. 3 is an enlarged transverse sectional view taken on the line 3—3 of FIG 2;

FIG. 4 is an enlarged fragmentary, longitudinal sectional view taken on the line 4—4 of FIG. 3; and FIG. 5 is a diagrammatic representation of the electrical control circuit.

Referring to FIGS. 1 to 4, the reference numeral 10 generally designates the meat treating apparatus, which comprises a rectangular base or supporting structure including four upright legs 12, one at each corner, connected, adjacent their upper ends by a pair of longitudinally extending side members 14. A transverse member 15, FIG. 1, at the left end of the machine, maintains the side members 14 in spaced relation.

The upper surface of the side members 14 is spaced slightly below the upper end of the legs 12, and a series of longitudinally spaced, cross members 16 interconnect said side members. The ends of the cross members 16 are secured to the side members 14 by bolts 18, the upper ends of the bolts being seated within recesses 20, as shown in FIG. 3. The depth of the cross members 16 is such that the upper surface thereof lies in the same horizontal plane as the upper end of the legs 12.

The cross members 16 serve as a support for a centrally located bed 22. The bed 22 comprises a metallic bed plate 24 in the form of an inverted shallow pan having downwardly extending sides 26 and ends 27. The bed plate 24 is actually the bottom of the pan and has holes in which headed pins 28 are mounted and project upwardly therefrom. The bed plate 24 is stiffened by a body of concrete 30 that fills the pan. Stud bolts 32 extend through openings in the sides 26 and have their heads embedded in the concrete 30. The body of concrete 30 rests upon the upper surface of the cross members 16. Angle irons 36 are secured to the ends 27 of the bed plate 24, as by welding. Each of the angle irons 36 overlies a cross member 16 and is secured thereto by bolts 34 (FIGS. 1 and 2). These bolts permit easy removal of bed plate 24 for cleaning or replacing with other size plates.

The threaded ends of the stud bolts 32 project beyond the sides 26 of the bed plate 24 and support a pair of rails 38, one of which is disposed at each side of the bed 22. The rails 38 have vertically extending slots 40, which cooperate with the studs 32 to permit vertical adjustment of said rails for a purpose set forth hereinafter. Nuts 42 threaded on the stud bolts 32 retain the rails 38 in vertically adjusted position.

The exposed upper portions of the aforedescribed framework are covered by longitudinally extending top plates 46 (FIG. 3). Side boards 44 extend along the edge of the top plates 46 for the full length of the structure and overlie the upper side portion of the legs 12 and the ends of the cross members 16, respectively.

Two guide rails 48 are mounted in outwardly spaced relation to the rails 38, and rest on the top plates 46. Bolts 50 extend through aligned openings in the guide rails 48, top plates 46, and cross members 16 and secure these parts together. The guide rails 48 are longer than the supporting framework, so that they project beyond the left end of the framework, as shown in FIGS. 1 and 2, for a purpose that will appear later. The guide rails 48 are of uniform height through a major portion of their length, as shown in FIG. 2. However, they increase in depth as indicated by the incline at 47, and continue toward the right at a greater uniform depth, as indicated at 49, for the remainder of their length.

Two roller support members 52, FIGS. 1 and 2, extend longitudinally of the framework, with one end of each of the support members overlying the adjacent end of the bed plate 24. The overlying portions are inclined, as indicated at 53, and form a ramp leading to a concave portion or saddle 56, the function of which will be explained later.

The overhanging ends of the guide rails 48 carry a transverse motor support 58, which is secured in place by screws 59, as shown in FIG. 1. A reversible electric motor 60 is secured to the motor support 58 by bolts 61. Spaced inwardly from the motor 60, and extending transversely of the guide rails 48, is a sprocket shaft 62. Sprocket shaft 62 has its end extended beyond the guide rails 48, and each end carries a sprocket 64 fixed thereto. The shaft 62 is rotatably mounted in bearings 66 mounted to the top of the guide rails 48. A second sprocket shaft 68 is similarly mounted at the other end of the guide rails 48. The shaft 68 also has ends that project beyond the guide rails 48 and have sprockets 70 secured thereto. Bearings 72 rotatably mount the shaft 68 on the guide rails 48. A pair of chains 74 extend around the sprockets 64 and 70. The ends of the upper run of each chain are secured to lugs 75 projecting diametrically from a sleeve 76, and in effect providing endless chains. The sleeves 76 are freely mounted upon a roller shaft 78. A pair of collars 80, fixed to the ends of the roller shaft 78, prevent the sleeves 76 from slipping off the ends of the shaft.

The roller shaft 78 has a roller 82 mounted thereon. The roller 82 comprises a hollow, smooth, cylindrical housing 83 of drumlike form, which is preferably filled with concrete 84 to give it the desired weight. A pair of collars 86 is mounted on the shaft 78 between the sleeves 76 and the ends of the roller 82 to prevent axial movement of the sleeves inwardly toward the roller. The roller 82, when in its inactive position, rests in the concave saddle 56 of the roller supports 52, as shown in FIG. 2.

A conventional speed-reducing device 88 is supported on a cross-member 89 adjacent the motor 60 and is driveably connected with the motor by a shaft 61. The reduction gear 88 has an output shaft 90 that is connected by a chain and sprocket drive 91 with the shaft 62.

A cycle-starting switch 92, having the usual "start" and "stop" buttons, is mounted on one of the guide rails 48 at a point adjacent the motor 60. A main on-and-off switch 94 is mounted adjacent the switch 92, so that both switches are within convenient reach of an operator.

A tank 96 is positioned below the bed 22, FIGS. 2 and 3, so that any liquid flows from the meat being treated and onto the bed 22 can drain over the ends of the bed plate 24 and, from the sides thereof through the slots 40 in the rails 38, and be caught by the tank 96.

Referring to FIG. 3, the roller 82 is of greater length than the distance between the rails 38, and is shorter than the distance between the guide rails 48, so that the roller can ride upon the upper edges of the rails 38, when in use, while the guide rails 48 limit the axial movement of the roller, so that it remains upon the rails 38.

A slab of meat 98, which may be a side of bacon (belly), is shown in dot-and-dash lines in FIG. 1 and in solid lines in FIG. 3 and 4. It will be noted that the slab 98 is impaled upon the pins 28, so that it cannot move lengthwise along the bed 22. The present apparatus is adapted to be positioned adjacent a "stitching" machine, so that the slab 98 is impregnated with a brine or pickling solution before it is manually placed upon the pins 28. It will be understood that the bed 22 may be made of any desired length, so that more than one slab 98 of meat can be positioned thereon at the same time. As has been previously indicated herein, the stitching machine comprises needles that penetrate the slab 98 and inject treating solution therein under pressure, while the needles are penetrating the slab.

The slab 98 is normally much thicker than the height of the rails 38 above the bed plate 24. In any event, the rails 38 may be raised or lowered by adjusting the same on the studs 32, so that slabs of a given thickness will be compressed by the roller 82 to an extent limited by the position of the upper edge of the rails 38 relative to the bed plate 24. The slabs will vary in size, shape and thickness throughout their length. A typical slab may be about 2½ inches thick at its thickest point and about 1½ inches thick at its thinnest part, and vary in length from about 18 inches to 30 inches or more. As a typical example, the rails 38 may be adjusted so that they extend about ¾" above the bed 22, for a slab having a maximum thickness of about 2½ inches.

In operation, a slab 98, which has been impregnated with a treating solution, is manually impaled upon the pins 28. The cycle starting switch 92 is then actuated, whereupon the electric motor 60 drives the reduction gearing 88, and the sprocket drive 91 rotates the shaft 62 in a direction such that the sprockets 64 and chains 74 cause the roller 82 to ride off the saddle 56 and onto the upper edge of the rails 38. As the chains 74 pull the roller 82 toward the left end of the bed 22, as viewed in FIG. 2, the roller 82 is caused to pass over the upper surface of the slab of meat 98, thereby progressively applying pressure to successive portions of the slab and producing a limited compressive action on the slab, as diagrammatically illustrated in FIG. 4. The weight of the roller 82 is sufficient to compress the slab 98 to the extent permitted by the adjustment of the rails 38. The roller pressure causes the treating solution contained in the meat to be uniformly dispersed through the tissue of the meat and also causes excess treating solution to be forced out of the meat.

It will be understood that the rolling action commences at the right end of the slab, as viewed in FIG. 1, and that the pressure is progressively applied to local areas of the meat on a theoretical line contact, as the roller 82 rolls across the top of the slab.

According to the structure illustrated, the roller 82 continues its rolling movement beyond the left end of the slab 98 until it engages a limit switch 110, FIG. 2, mounted on one of the guide rails 48. Actuation of the switch 110 interrupts the circuit to the electric motor 60 and arrests movement of the roller 82. The switch 110 includes a time-delay mechanism, which maintains the circuit interrupted for about five seconds, and then completes a circuit to effect driving of the motor 60 in the reverse direction. Reverse driving of the motor 60 causes the roller 82 to roll over the rails 38 in the opposite direction, or toward the right. The rolled slab 98 may be allowed to remain upon the bed 22 to permit the roller 82 to make a second pass thereover, or the slab may be removed during the five-second delay interval, and a different slab placed upon the bed 22 to be pressed by the roller 82 on its return pass. After the roller 82 has traversed the bed 22, it rides up on the ramps 53 and into the saddle 56. A limit switch 112 is mounted on a support 113 on the high part 49 of the roller guides 48 and is actuated by the roller 82 as it seats itself in the saddle 56. Actuation of the limit switch 112 interrupts the circuit to the motor 60 so that it stops. This concludes the cycle. The foregoing cycle of operation may be repeated indefinitely, with the slab 98 on the bed 22 being subjected to the compressing action of the roller 98 one or more times, as desired.

It has been found that best results are obtained when the roller 82 travels slowly over the slab of meat 98 at a peripheral speed, for example, of 17 feet per minute. This rate of movement allows sufficient time for the treating solution to thoroughly impregnate the tissues of the meat. The pressure of the roller 82 will also force any treating solution that has collected in a pocket or other cavity in the slab to be distributed into other portions of the meat, or to be forced out of the slab as excess. Highly satisfactory results have been obtained by passing the roller over the slab only once. If more than one pass is desired, the slab may be turned over on the bed between successive passes, although, normally, turning would not be necessary. It will be understood, of course, that the peripheral speed of the roller 82 can be varied, depending upon the weight of the roller and the thickness to which it is desired to compress the slab on the bed 22.

The aforedescribed method and apparatus may be utilized in treating meat cuts other than slabs of bacon, for example, boned hams and slabs of beef, and the rails 38 at the sides of the bed 22 adjusted to suit the particular cut or thickness of the meat that is being rolled.

Regardless of the type of meat being treated, the slow-rolling action causes the pickling solution to be uniformally distributed throughout the slab, the pressure being limited by the adjustment of the rails 38 to avoid removal of more than the excess amount of the treating solution that is present. The roller action and the pressure employed is sufficient to provide a "kneading" action on the meat, and to disperse the treating solution throughout the slab, but is insufficient to break down the fibers. After the rolling operation has been completed, the slab is ready to be smoked and/or given any other further treatment desired.

It has been found that the uniform distribution of the pickling solution throughout the slab not only improves the taste of the meat but greatly decreases the time factor between pickling and smoking and results in substantial savings in both costs and time. In this connection, under present practice, the hanging or "drying" operation requires about twelve to eighteen hours; whereas, the present process removes excess pickling solution and prepares the meat for further processing in a matter of seconds. Moreover, the uniform distribution of the pickling solution imparts a uniform and pleasing color to the meat, avoiding the discolored areas and objectionable tasting portions that previously resulted from excess treating solution being localized in pockets or other areas within the meat and remaining therein during the smoking and curing operations.

It has also been found that the compression of the fibers of the meat by rolling the same according to the present method and apparatus is not detrimental for the reason that the meat subsequently expands to substantially its original size when heat is applied thereto in the subsequent smoking and curing operations.

Experience has also established that the present apparatus can roll from two to six slabs (bellies) per minute and can be used in connection with a stitching machine wherein the slab can be transferred directly from the stitching machine to the present pressure-rolling machine without delay.

An electrical circuit for effecting an automatic cycle operation of the treating apparatus disclosed herein is diagrammatically illustrated in FIG. 5, wherein leads 100 and 102 are connected to a source of electrical power to supply current for the reversible motor 60. As shown, the circuit includes a main switch 94, a reverse relay 104, a time delay relay 106, a forward-running relay 108, a normally closed limit switch 112, a limit switch 110, and a cycle starting switch 92.

In order to start the cycle, the main switch 94 is actuated to its closed position, and the "Start" button of the switch 92 is pressed to its circuit closing position. Electrical current then flows through the conductors 100 and 140, contact 139, switch 92, contact 141, conductor 138, solenoid 114 of normally open relay 108, and conductors 136, 134 and 102. Solenoid 114 thus becomes energized to close the relay 108. At this time, the roller 82 is in its position shown in solid lines in FIGS. 1 and 2, in contact with the limit switch 112, which is thereby held in its open position.

Actuation of the relay 108 establishes a holding circuit through the conductors 100, 156, contact 120, switch 132, contact 126, conductor 158, switch 160, conductors 162, 138, solenoid 114 and conductors 136, 134 and 102, whereupon the "Start" button of switch 92 can be released and the cycle will be self-operating. Electric current to the motor windings travels through conductors 100, 148, contact 118, switch 130, contact 124, conductors 150, 152 through the motor winding, not shown, conductors 144, 214, 142, contact 122, switch 128, contact 116, and conductors 134 and 102, and by way of conductors 100 and 156, contact 120, switch 132, contact 126, conductors 218 and 154, motor winding, not shown, and conductors 146 and 102. The motor 60 is operated in a direction to drive the chains 74 to move the roller 82 toward the left to initiate a cycle of operation. As the roller 82 starts its movement, the limit switch 112 is permitted to close. The electric motor 60 drives the chains 74 to move the roller 82 at the desired speed, causing the roller to pass over the slab of meat 98, as described above, and to continue its movement until it strikes the limit switch 110, which is effective to open the switch 160 and to close the switch 164 of the limit switch 110. Opening of the switch portion 160 breaks the holding circuit for the solenoid 114, allowing the relay 108 to open, which breaks the circuit to the motor 60 and brings it to a stop.

Closing of the switch 164 completes a circuit through conductors 100, 166, switch 164, conductors 168, 170, 171, solenoid 172 of the time delay relay 106, and conductors 174 and 102. After a delay of about five seconds, depending upon the time for which the delay relay 106 is set, the relay 106 becomes operative to close the switch 176 therein, whereby a circuit through conductors 100, 166, switch 164, conductors 168, 170, 182, contact 178, switch 176, contact 180, conductor 184, solenoid 186 of relay 104, and conductors 188 and 102 produces a flow of electrical energy through the solenoid 186 to energize the normally open relay 104. Closing of this relay causes a current flow through the motor winding, through the conductor 100, contact 192, switch 204, contact 198, conductors 210 and 144 through the motor winding, not shown, conductors 152 and 208, contact 196, switch 202, contact 190 and conductors 188 and 102; and through the other motor winding by way of conductor 100, contact 194, switch 206, contact 209, conductors 212, 154 through the winding of the motor, not shown, and conductors 146 and 102. The direction of the motor 60 is thereupon reversed, producing driving of the chains 74 to effect movement of the roller 82 from the left toward the right in FIGS. 1 and 2, causing the roller to pass in the opposite direction over the same slab of meat, or over a different slab of meat, which movement continues until the roller has completed its travel and enters the saddle 56 to strike the limit switch 112 to open the switch 160, thereby breaking the holding circuit through the conductor 100, contact 192, switch 204, contact 198, conductors 210, 214, 216, switch 160, conductors 170, 182, contact 178, switch 176, contact 180, conductor 184, solenoid 186 and conductors 188 and 102. The relay 104 is thereby de-energized, and the motor 60 is stopped in position for the next cycle of operation.

Although, in the preferred embodiment described above, the roller pressure is applied by the force of gravity, it is obvious that the pressure may be supplemented by hydraulic or compressed gas-actuated jacks.

Repeated tests have proven that the process and the apparatus disclosed produce better flavored and cured meat in a total treatment time of one and one-half hours to three hours, than is being produced in sixteen hours or longer by previously known processes.

Having fully disclosed my invention, it is to be understood that I do not wish to be limited by the details herein set forth, but that my invention is of the full scope of the appended claims.

I claim:
1. The process of distributing treating fluid in, and removing excess treating fluid from, a piece of meat, comprising: progressively moving a rolling weight in one direction across a stationary piece of meat containing a treating fluid, starting from one edge and working toward the opposite edge, and moving the rolling weight at a speed sufficiently low to cause the treating fluid to be substantially uniformly distributed in the meat and to force any excess treating fluid out of the meat, whereby the meat is given an opportunity to absorb and retain all but excess treating fluid without damaging the meat or permanently reducing its dimensions.

2. The process as defined in claim 1, including, inverting the piece of meat, and repeating the rolling movement of the weight across the meat.

3. The process of distributing treating fluid in, and removing excess treating fluid from, a piece of meat, comprising: supporting at one side thereof a piece of meat containing a treating fluid; applying the force of a weight across the other side of said piece of meat; and slowly moving said weight and piece of meat relatively to each other while applying pressure to said piece of meat starting at one point and working toward another point until pressure has been applied over the entire area of said piece of meat to cause the treating fluid to be substantially uniformly distributed in the meat and to force any excess treating fluid out of the meat, whereby the meat is given an opportunity to absorb and retain all but excess treating fluid without damaging the meat or permanently reducing its dimensions.

4. The process of distributing treating fluid in, and removing excess treating fluid from, a piece of meat, comprising: supporting at one side thereof a piece of meat containing a treating fluid; applying pressure to said piece of meat along a zone extending across the other side of said piece of meat; and manipulating the zone of pressure application and said piece of meat relatively to each other until pressure has been applied over the entire area of said other side of said piece of meat to cause the treating fluid to be substantially uniformly distributed throughout the meat and to force any excess treating fluid out of said meat without damaging the meat or permanently reducing its dimension.

References Cited in the file of this patent
UNITED STATES PATENTS

| | | |
|---|---|---|
| 817,930 | Nelson | Apr. 17, 1906 |
| 1,194,266 | Alvord | Aug. 8, 1916 |
| 1,731,648 | Block | Oct. 15, 1929 |
| 1,938,444 | Vedder | Dec. 5, 1933 |
| 2,180,165 | Nietiedt | Nov. 14, 1939 |
| 2,191,144 | Hornbostel | Feb. 20, 1940 |
| 2,430,849 | Williams | Nov. 11, 1947 |